United States Patent [19]

Bongers et al.

[11] Patent Number: 4,465,301
[45] Date of Patent: Aug. 14, 1984

[54] SAFETY STEERING COLUMN ASSEMBLY FOR AUTOMOBILES

[75] Inventors: Bernd Bongers, Kirchheim; Konrad Brand, Höhenkirchen, both of Fed. Rep. of Germany

[73] Assignee: Messerschmitt-Bölkow-Blohm Gesellschaft mit beschrankter Haftung, Munich, Fed. Rep. of Germany

[21] Appl. No.: 323,357

[22] Filed: Nov. 20, 1981

[30] Foreign Application Priority Data

Nov. 29, 1980 [DE] Fed. Rep. of Germany ....... 3045141

[51] Int. Cl.³ .............................................. B62D 1/18
[52] U.S. Cl. .................................... 280/777; 74/492; 74/501 P
[58] Field of Search ................. 280/777; 74/492, 493, 74/501 P

[56] References Cited

U.S. PATENT DOCUMENTS

| | | | |
|---|---|---|---|
| 3,373,629 | 3/1968 | Wight | 74/492 |
| 3,482,466 | 12/1969 | Orlich | 280/777 |
| 3,495,474 | 2/1970 | Nishimura | 280/777 |
| 3,508,633 | 4/1970 | Nishimura | 280/777 |
| 3,564,688 | 2/1971 | DeGain | 74/492 |
| 3,612,223 | 10/1971 | Shiomi | 74/492 |
| 3,771,379 | 11/1973 | Rohrbach | 74/492 |
| 3,983,963 | 10/1976 | Nakamura | 74/492 |

OTHER PUBLICATIONS

*Standard Handbook for Mechanical Engineers*, 7th Ed., McGraw-Hill Book Co., 1958, 1967, pp. 194, 195, T. J. 151 M37.

Primary Examiner—Bruce H. Stoner, Jr.
Assistant Examiner—John A. Carroll
Attorney, Agent, or Firm—Toren, McGeady and Stanger

[57] ABSTRACT

A safety steering column assembly for automobiles, arranged to shorten under the effect of a predetermined force exerted during an impact accident, includes a steering column with a safety sleeve forming a part of the column. The safety sleeve is a grid tube made up of wound laterally spaced grid strands. Each grid strand consists of a plurality of plastics material impregnated fiber strands. The grid strands are located outwardly from and are wound angularly of and around the steering column axis. Adjacent grid strands having the same angular orientation relative to the axis are spaced laterally apart. Further, the grid strands are disposed in crossing relationship.

4 Claims, 8 Drawing Figures

SAFETY STEERING COLUMN ASSEMBLY FOR AUTOMOBILES

SUMMARY OF THE INVENTION

The present invention is directed to a safety steering column assembly for automobiles, arranged to shorten under the effect of a predetermined force exerted during an impact accident, and including a steering column with a safety sleeve forming a part of the column. The safety sleeve is a grid tube made up of grid strands.

Due to safety regulations presently in force, steering columns must be constructed so that they transmit the torque developed during operation of an automotive vehicle while causing as little torsion as possible. It is important, however, that the steering column deform in its axial or longitudinal direction during an impact accident. The energy absorbed by the steering column during deformation must be reversible returning the column to its original form so that it remains operative. The steering column should not break as the longitudinal deformation increases. The force which causes a break, however, may not exceed a certain maximum value, since the driver of the vehicle could be injured during an impact accident.

The arrangements of safety steering columns having practical application are based on two principles.

According to one principle, the safety steering column is made up of two parts connected together in a form-locking manner relative to the application of torque yet longitudinally slidable relative to one another. When an impact accident occurs, a longitudinally directed axial or longitudinal force is exerted on the two steering column parts and the parts move relative to one another with the steering column being shortened. After a certain reduction in its length, the two parts of the column are separated and disengaged. Following such disengagement, the two parts slide over or into one another, such as in the manner of telescopic tubes.

Safety steering columns constructed in accordance with this principle require a complicated and consequently expensive construction.

In the other principle for constructing safety steering columns, the elastic and plastic properties of metallic materials are utilized. Such safety steering columns are formed, at least in the region which shortens during an impact accident, of a metal grid tube or a corrugated tube. The grid or corrugated tube must be manufactured with extreme accuracy, since the above-mentioned safety requirements must be followed as closely as possible, that is, without tolerances. As a result, the manufacture of safety tubes for steering columns is very difficult and complicated. Moreover, metal grid tubes are very heavy so that the torque developed during steering operations is transmitted with low torsion.

Therefore, it is the primary object of the present invention to provide a steering column assembly with a safety sleeve in the form of a grid tube which is simple to manufacture so that the safety requirements are easily and exactly met.

In accordance with the present invention, the grid tube is constructed as a wound member made up of fiber reinforcing grid strands extending angularly relative to the axis of the steering column and crossing one another.

In accordance with a known method, the safety sleeve grid tube is wound on a winding mandrel using one or several plastics material impregnated fiber strands. After being wound, the grid tube is hardened and then removed from the winding mandrel. During the manufacture of this wound member, the specific properties of composite fiber materials are utilized, particularly the load-bearing capacity of the wound member which is direction-controlled in accordance with the selected winding process. The arrangement of the safety sleeve grid tube, based on the very specific desired properties of the sleeve are made possible during the winding process. In combination with the manufacturing process which is adjustable to the material used, safety steering columns can be produced which precisely reproduce the above-mentioned properties, however, the wound grid tube is relatively light and can be produced economically.

The grid strands of the the grid tube safety sleeve are made up of individual fiber strands in several superposed layers with the strands disposed at an angle of $\pm 45°$ with respect to the longitudinally extending axis of the safety sleeve. Where the grid strands intersect, the fiber strands arranged at the $+45°$ angle and the fiber strands arranged at the $-45°$ angle are wound in alternating layers so that at the points of intersection the fiber strands are in an interleaved arrangement.

The requirements for the rigidity of the safety sleeve can be varied to a considerable extent, for instance the number of layers of fiber strands in a grid strand can be varied or the width of the fiber strands can be changed. Further, it is also possible to vary the angular orientation of the wound grid strand relative to axis of the safety sleeve.

While the angular orientation of the fiber strands wound on the mandrel can be freely selected, it is preferable if they are arranged so that at an optimum torsional rigidity and torsional strength, the longitudinal or axial rigidity and strength of the safety sleeve is kept as low as possible. The optimum angular orientation of the wound strands is at $\pm 45°$ relative to the axis of the sleeve, since only under such an arrangement are the individual grid strands between the crossing or intersecting locations, stressed for tension and compression during torsion, but for bending and shearing during an axially applied force. As a result, during torsional forces the safety sleeve has a high rigidity but during axially directed forces it has a low rigidity.

If there is a deviation of a few degrees from the angular orientation of the strands of $\pm 45°$, with a maximum deviation up to $10°$, under certain circumstances the rigidity in response to axial forces may even be lowered without any significant change in the torsional rigidity. As a result, a deviation from the angular orientation of $\pm 45°$ may be advantageous in an individual case.

The strength as well as the rigidity of the individual grid strands is much greater during axial loading than bending loading where the breakage of the grid strands is triggered by interlaminar shear fracture. A tendency to a desired failure in the axial direction can be increased whereby, with open net winding of the safety sleeve, the thrust surfaces between the grid strands extending with a $+45°$ angular orientation relative to those extending in a $-45°$ orientation are greatly reduced and thus during shear load on the safety sleeve, the desired premature failure takes place at the intersection locations of the grid strands.

The ratio of height and width of the individual grid strands can be varied in accordance with the desired requirements, that is, by selecting fiber strands with different widths in combination with the number of the wound layers. With the possibility of such variations, the longitudinal or axial rigidity of the safety sleeve can be changed without any significant influence on the torsional rigidity and strength, because the axial rigidity of the individual grid strands to tension and compression is dependent only on their cross-section, that is, it is independent of the height to width radio.

In one embodiment, the safety sleeve can have a circular cross section with the individual fiber strands having been wound on a round mandrel. In such an arrangement, the individual grid strands of the safety sleeve are slightly curved so that the torsional loads do not only extend in the long direction of the individual grid strands but also have a component perpendicularly of the grid strands.

In a preferred arrangement, the safety sleeve is wound on a mandrel having a regular polygonal cross-section with the wound safety sleeve also having a regular polygonal cross-section. During winding, the fiber strands are arranged so that the points of intersection fall on the edges of the mandrel, that is, the intersection of the polygonal sides. As a result, when the safety sleeve is completed, the intersecting locations of the strands are located on the polygonal edges. In such a wound safety sleeve, the individual grid strands between two intersecting locations are straight members so that during torsional load they are stressed almost exclusively in the longitudinal direction and are only in danger of bending at significantly higher torsional loads than is the case for the slightly curved grid members of the safety sleeve having a circular cross-section.

The various features of novelty which characterize the invention are pointed out with particularity in the claims annexed to and forming a part of this disclosure. For a better understanding of the invention, its operating advantages and specific objects attained by its use, reference should be had to the accompaying drawings and descriptive matter in which there are illustrated and described preferred embodiments of the invention.

DETAILED DESCRIPTION OF THE INVENTION

Figure 1:
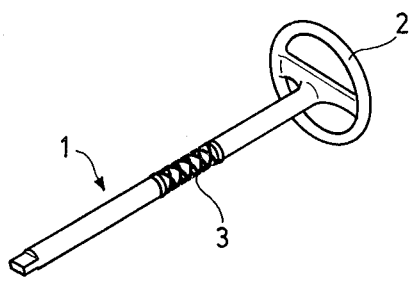
FIG. 1 is a schematic representation of a safety steering column assembly embodying the present invention with the assembly including a safety sleeve formed of fiber-reinforced plastics material making up a part of the steering column.

In FIG. 1 a safety steering column assembly for an automobile is shown schematically. The assembly consists of an axially elongated safety steering column 1 with a manual steering wheel 2 secured to its upper end and with its lower end extending into a steering unit, not shown. At approximately its central region in the axially extending direction, a safety sleeve 3 is located in the steering column 1 and the sleeve is formed as a grid tube of fiber reinforced plastics material, that is, fibers impregnated with a plastics material. The remaining parts of the steering column are of a conventional construction and are coaxially connected with the safety sleeve 3 by means not shown.

Figure 2:
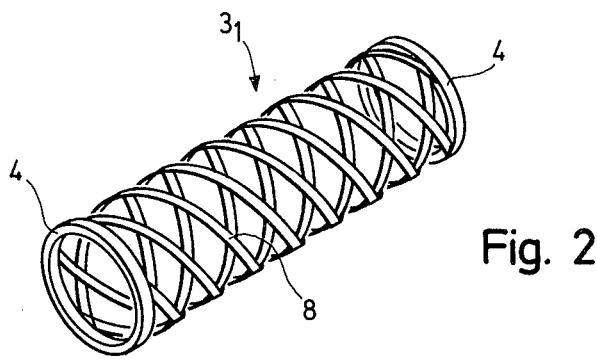
FIG. 2 is a perspective view of a first embodiment of a safety sleeve formed of fiber-reinforced plastics material for a safety steering column embodying the present invention.
Figure 4:
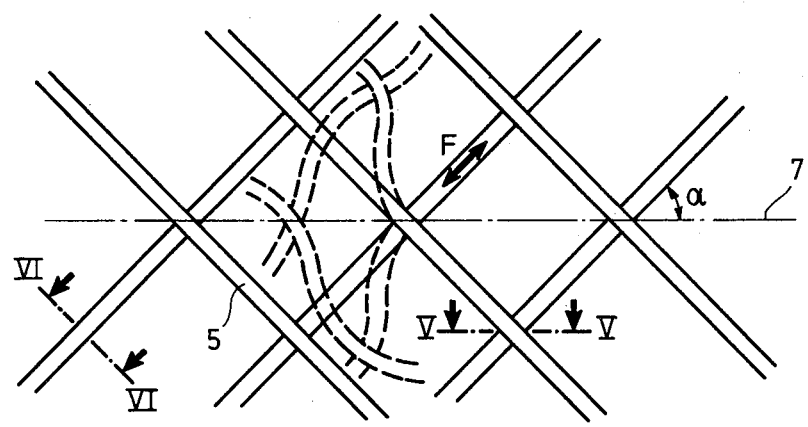
FIG. 4 shows a portion of the wound wall of a safety sleeve embodying the present invention.
Figure 6A:
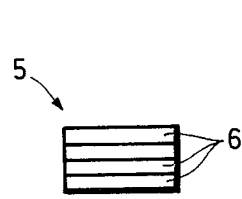
FIGS. 6A and 6B are cross-sectional views taken along the lines VI—VI in FIG. 4.
Figure 6B:
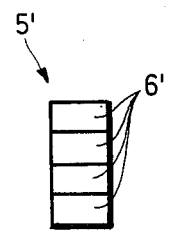

In FIG. 2 a safety sleeve $3_1$ with a circular cross-section is shown. The safety sleeve is constructed of fiber strands or rovings impregnated with a plastics material, such as a synthetic resin binder, and wound in a known manner on a winding mandrel, not shown, having a circular cross-section. Each of the opposite ends of the safety sleeve $3_1$ has a continuous rim 4 formed of a fiber-reinforced plastics material and between the ends the sleeve is a grid tube. The grid tube corresponds to a multiple winding pattern without a degree of advance. In FIG. 4 a part of the wound grid tube pattern is illustrated formed of intersecting or crossing fiber strands. As shown in FIGS. 6A and 6B each grid strand is made up of a plurality of plastics material impregnated fiber strands and, as illustrated, each grid strand is made up of four superposed layers of fiber strands 6. Depending on the safety requirements, the longitudinal rigidity of the safety sleeve $3_1$ and, accordingly, of the safety steering column, can be varied by changing the cross-section of the grid strands without significantly affecting the torsional rigidity of the safety sleeve. According to FIG. 6A, the grid strand 5 is made up of four layers of flat fiber strands 6 while in FIG. 6B the grid strands 5' are composed of four superposed layers of narrower but thicker fiber strands 6'.

Figure 5A:
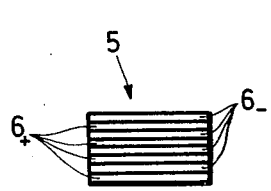
FIGS. 5A and 5B each illustrate cross-sectional views taken along the lines V—V in FIG. 4.
Figure 5B:
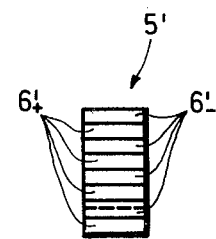

As can be seen in FIG. 4, the grid strands 5 extend, relative to the axis 7 of the safety column at an angle of $+45°$, while the other grid strands extend at an angle of $-45°$ relative to the axis. At the intersecting locations 8, the grid strands with a positive angular orientation and the grid strands with a negative angular orientation are wound in the manner shown in FIGS. 5A and 5B with the fiber strands $6_+$ and the fiber strands $6_-$ arranged in an alternating or interleaved arrangement. The rigidity of the safety sleeve and consequently of the safety steering column assembly can be influenced at the intersecting locations by the number of layers and the cross-section of the individual fiber strands. In FIG. 5A, four flat though relatively wide fiber strands 6 make up one group of the grid strands while in FIG. 5B another embodiment is illustrated where the fiber strands are narrower yet thicker with each grid strand made up of four fiber strands. In the embodiment of FIG. 5A, a relatively large shear surface results. In the embodiment of FIG. 5B a relatively small shear surface is present as shown by a dashed line.

Figure 3:
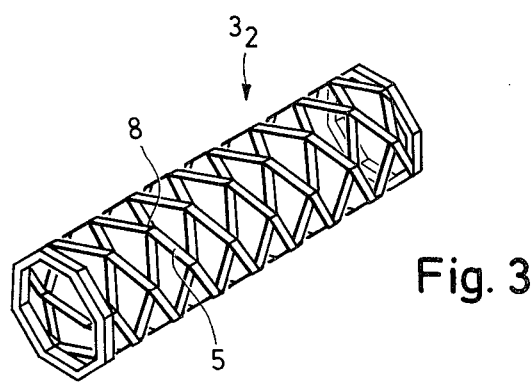
FIG. 3 is a view, similar to FIG. 2, of another embodiment of a safety sleeve formed of fiber-reinforced plastics material for a safety steering column.

In FIG. 3 a second embodiment of the invention is displayed with a safety sleeve $3_2$ having the cross-sectional shape of a regular octagon. The safety sleeve $3_2$ is constructed by winding plastics material impregnated fiber strands on a mandrel also having an octagonal cross-section with the intersecting crossing locations of the grid strands each located along an edge of the mandrel. The edges of the mandrel are formed at the intersections of the planar mandrel sides. In this arrangement, in the completed safety sleeve $3_2$ the intersecting locations 8 of the grids strands are always positioned on a line corresponding to one of the edges of the multiple edge sleeve. Between two adjacent intersecting locations, the grid strands form rectilinear rods or members all located in a single plane.

In FIG. 4 the load force F occurring during normal operations of the axially elongated column is shown. The load force F acts in the long direction of the grid strands. In the embodiment disclosed in FIG. 3, this load force is approximately maintained so that it extends in the long direction of the straight broad portions of the grid strands. In the embodiment of FIG. 2, however, because of the slightly curved configuration of the grid strands, the force F has a component which extends perpendicularly to the long direction of the grid strands.

In FIG. 4 the deformation of the grid strands caused by an impact accident with the force applied in the direction of the axis 7 is shown by dashed lines.

A safety steering column in accordance with the present invention can be adapted to the safety requirements desired for any particular case by using an appropriate construction of the plastics material impregnated fiber strands and with a corresponding dimensioning of such strands. The manufacture of the steering column safety sleeve in accordance with the present invention is simple and economical. Moreover, the safety sleeve for the steering column assembly has a low weight because of the materials used.

While specific embodiments of the invention have been shown and described in detail to illustrate the application of the inventive principles, it will be understood that the invention may be embodied otherwise without departing from such principles.

We claim:

1. A safety steering column assembly for automotive vehicles, arranged to shorten under the effect of a predetermined force exerted during an impact accident, comprising an axially extending steering column, a safety sleeve forming a part of and extending in the axial direction of said steering column, said safety sleeve is a grid tube, wherein the improvement comprises that said grid tube is formed separately from and is coaxially connected to said steering column, said guide tube comprises a member formed of fiber reinforced plastics material made up of separate grid strands each formed of a plurality of plastics material impregnated fiber strands with each of said grid strands located outwardly from and extending angularly of and wound around the axis of said steering column, said grid strands including a first group and a second group of separate and individual said grid strands with said grid strands of said first group extending angularly across said grid strands of said second group and disposed in contact therewith, each said grid strand comprises a plurality of said fiber strands arranged in separate superposed layers and at the intersecting locations of said grid strands of said first and second groups said superposed layers of fiber strands of said first and second groups are disposed in alternating and interleaved relation relative to the axis of said steering column so that each said layer of fiber strands in each of said first and second groups is in contact with at least one said layer in the other said group.

2. A safety steering column assembly, as set forth in claim 1, wherein said grid strands of said first group extend at an angle of approximately $+45°$ relative to the axis of said steering column and said grid strands of said second group extend at an angle of approximately $-45°$ relative to the axis of said steering column.

3. A safety steering column assembly, as set forth in claims 1 or 2, wherein said grid tube has a circular cross section transverse of the axial direction of said steering column.

4. A safety steering column assembly, as set forth in claims 1 or 2, wherein said grid tube has a cross section of a regular polygon transversely of the axial direction of said steering column, and the intersecting locations of said grid strands of said first and second groups are all located on the edges of the regular polygon formed by said safety sleeve.

* * * * *